May 20, 1969  R. P. S. BUCKLE  3,444,985
SELECTIVE DELIVERY CONVEYORS

Filed Jan. 30, 1967  Sheet 1 of 4

Inventor
Richard P. S. Buckle
by Sommers & Young
Attorneys

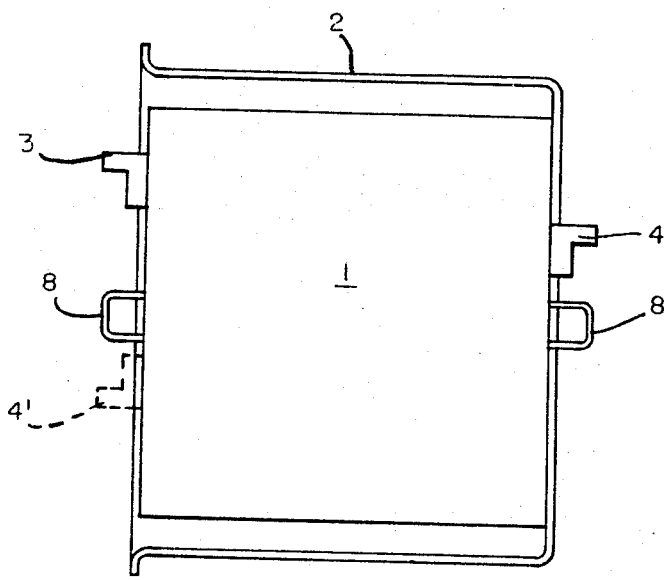
FIG. IA.

Inventor
Richard P.S. Buckle
by Sommers & Young
Attorneys

May 20, 1969     R. P. S. BUCKLE     3,444,985
SELECTIVE DELIVERY CONVEYORS
Filed Jan. 30, 1967
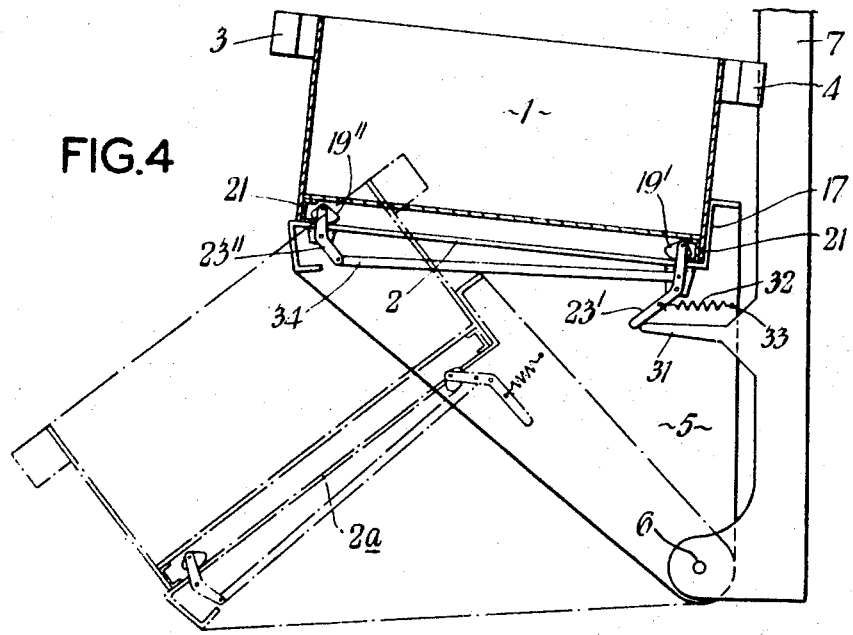
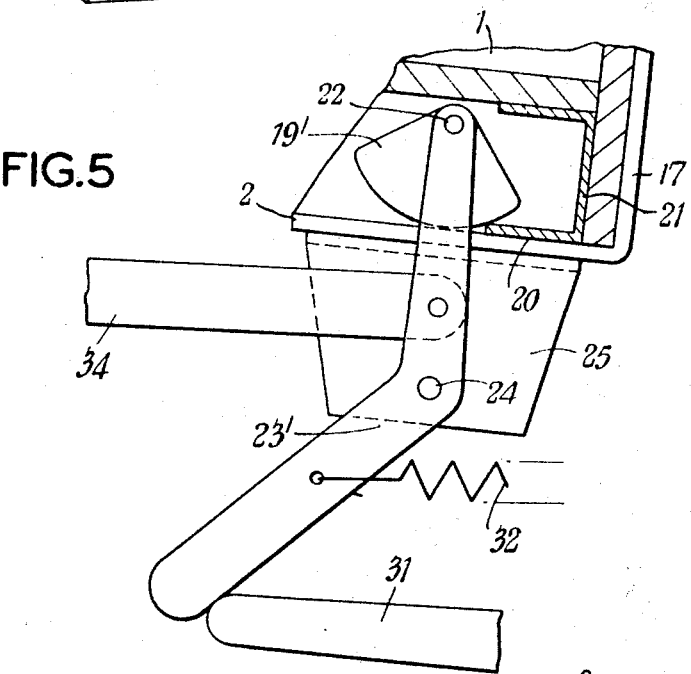
Inventor
Richard P.S. Buckle
by Sommers & Young
Attorneys

United States Patent Office 3,444,985
Patented May 20, 1969

3,444,985
SELECTIVE DELIVERY CONVEYORS
Richard Percy Stanley Buckle, Kent, England, assignor to Sovex Limited, Kent, England, a corporation of Great Britain
Filed Jan. 30, 1967, Ser. No. 612,591
Claims priority, application Great Britain, Feb. 3, 1966, 4,810/66
Int. Cl. B65g 47/38
U.S. Cl. 198—38                                    8 Claims

ABSTRACT OF THE DISCLOSURE

The disclosure relates to a selective delivery conveyor of the kind in which the material to be conveyed is placed in containers which are selectively loaded onto and removed from carriers forming a part of the conveyor. A means is provided which permits delivery of any container only at a selected destination, and there is a locking means provided on each carrier for latching the container to the carrier so as to make it impossible to remove. A further means is provided for automatically releasing the locking means when the container reaches its selected destination.

---

This invention concerns improvements relating to conveyors, particularly elevating conveyors and hoists, of the kind in which the material to be conveyed is loaded on to and removed from carriers, forming part of the conveyor, in containers. Such conveyors may serve, for example, for the automatic transmission of articles selectively between the several floors of a large building. Thus postal matter in containers may be loaded on to the conveyor at one point, for instance a post room in a basement, and be automatically delivered, in the containers, to the appropriate floors.

Particularly if the several floors of the building are occupied by different tenants, security problems can arise. Although the control means will effect delivery of a container at the selected destination only, its contents could be removed while it was passing delivery or loading points at floors. Provision may be made for closing and locking the containers before they are dispatched, but a container could still be removed bodily and rifled. It is one object of the invention to obviate this risk.

A further object of the invention is to provide a simple destination-selection arrangement suitable, inter alia, for such an elevating conveyor serving several differently occupied floors of a building.

For the purpose of achieving the first object, it is proposed that provision should be made for the containers to be latched or locked to the conveyor on dispatch and to be automatically released only upon reaching the destination for which selection means has been set.

The second of the above-mentioned objects may be achieved by the provision of selection means on the containers, preferably differently located projections engageable with correspondingly located triggers or other detection means at respective delivery points, such fixed selection means being provided at two different sides of such container, preferably at opposite ends, the selection means at one such side of a container being located in a position corresponding to a respective delivery point, containers destined for different delivery points having differently located selection means, while the selection means at the other side is located in the same position on all containers.

As applied to the above-mentioned example of an elevating conveyor for delivering postal matter to several floors of a building, the arrangement just described may comprise containers with fixed selection means at one end, each producing delivery at one floor only. It is therefore only necessary for the containers to be loaded on to carriers of the conveyor in the post room with the said selection means in the operative position in order to ensure delivery at the respective floors. For the return of containers to the post room, it is only necessary to load them on to the carriers in the reversed position, in which the other fixed selection means will be operative to ensure delivery of all containers to the post room. No setting of adjustable selection means on either occasion is required, so that the use of the conveyor is extremely simple. The containers may be lockable by keys held only by the post-room official and the respective tenants.

Variants of this arrangement may be adopted to meet particular requirements, for example, if one tenant occupies two or more floors. One selection means may then serve the two or more floors. Alternatively adjustable selection means may be provided on the containers for these floors, but not on the others. Or all delivery may be effected at one of the said floors, for example the first reached.

Examples of means in accordance with the invention for locking containers to the carriers of an elevating conveyor will now be more fully described with reference to the accompanying drawings, in which:

FIGURE 1A is a plan view of a container on a tray.

Figure 1:
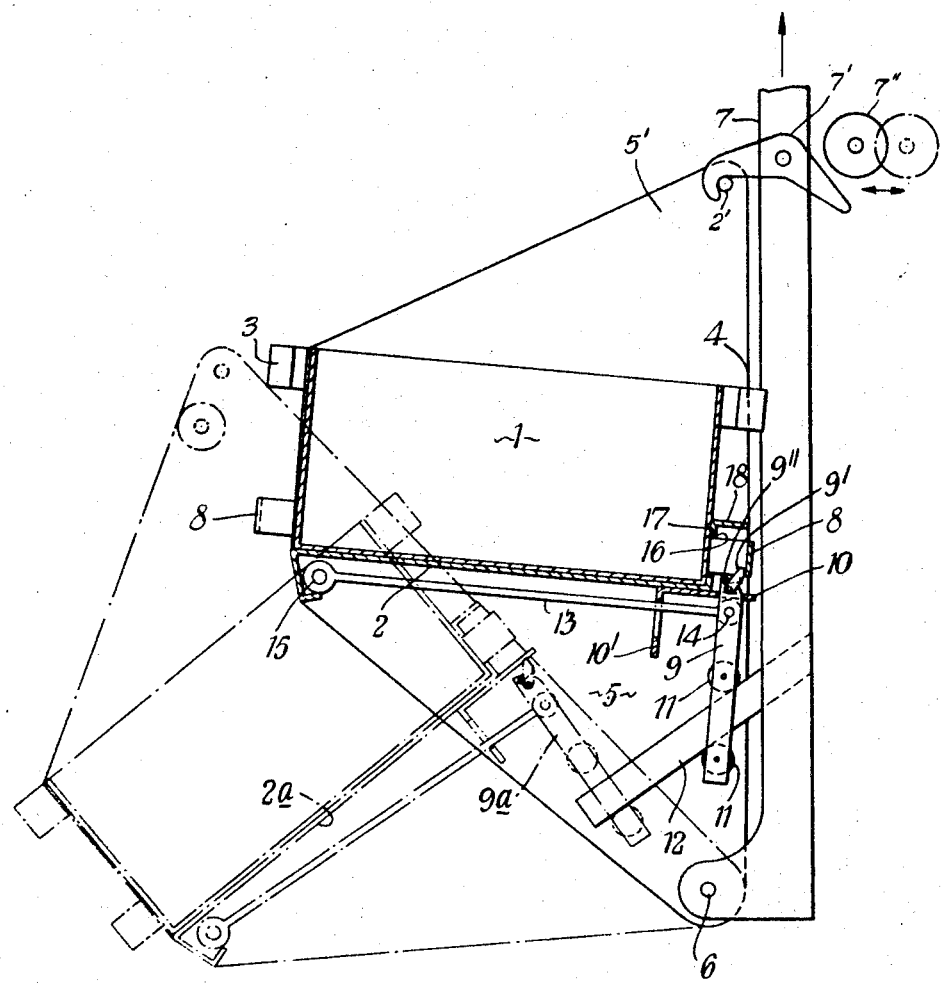
FIG. 1 is a side elevation of a conveyor tray with one form of locking means.
Figure 2:
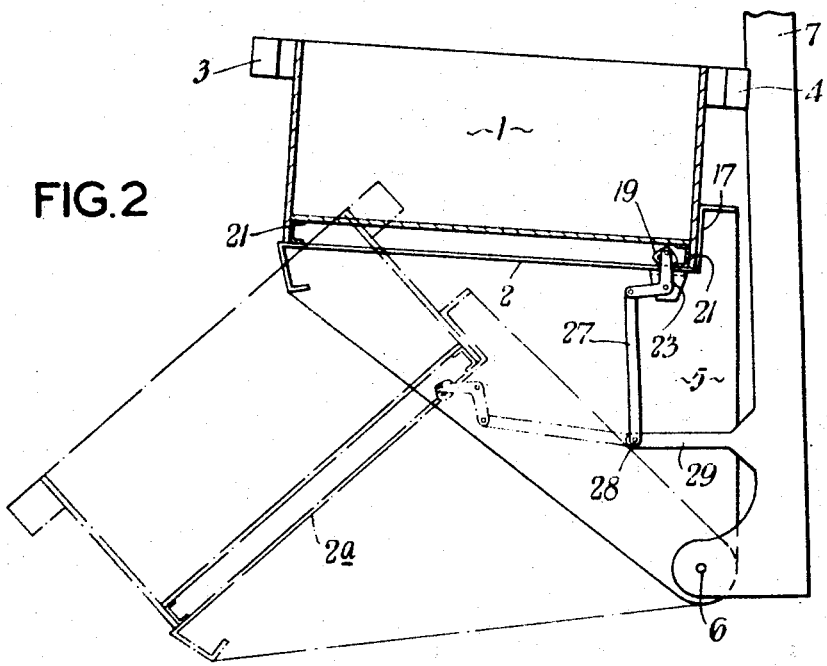
Figure 3:
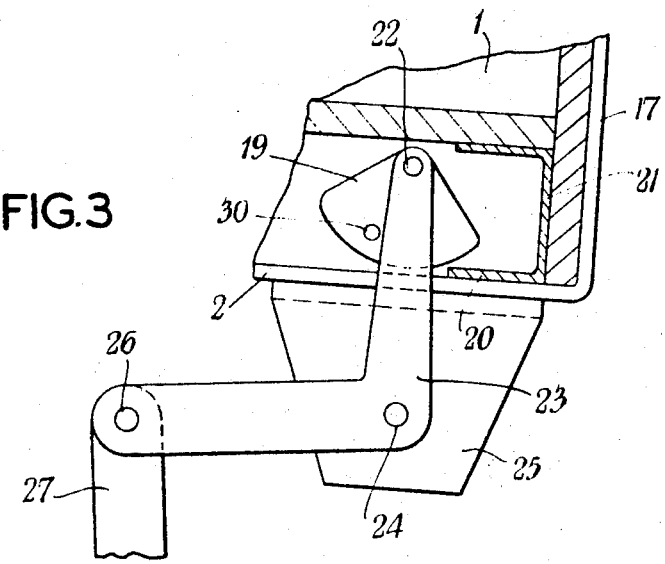

FIG. 2 a view similar to FIGURE 1 showing a second form of locking means,

FIG. 3 a detailed view of the locking means of FIG. 2 to a larger scale,

FIG. 4 a view similar to FIG. 1 showing a third form of locking means, and

FIG. 5 a detail view of the locking means of FIG. 4 to a larger scale.

In these examples, it is to be assumed that the conveyor is of the type, in which containers 1 are loaded on to trays 2 suspended at intervals from one or two continuously travelling chains following an endless path around upper and lower sprocket wheels. Conveyors of this type are well known and need not be further described here. The trays 2 are loaded with the containers 1 at points in the downward flight of the conveyor and are discharged in the upward flight, discharge of a container being effected automatically at the required destination by tilting the tray forwardly to the position shown in chain lines at 2a in FIGS. 1, 2 and 4 under the control of mechanism which may be of per se known type. The destination-selection means is of the kind, referred to above, comprising a projection from each end of the container 1. Such projections are indicated diagrammatically at 3 and 4. Either of the projections 3, 4 can be brought into the operative position by simply reversing the otherwise symmetrical container, the position of the projection 4 when the container is reversed being shown in broken lines at 4' in FIGURE 1A. The container is shown as being of box form and will have a lockable lid (not shown).

Each tray 1 is supported by side plates 5 of roughly triangular shape pivotally mounted at 6 upon an upright frame 7 at the downwardly pointing apices of the said plates, the said frame being suspended from the chain or chains (not shown) of the conveyor. The tray 1 is normally latched to the frame 7 in per se known manner by means automatically releasable under the control of the aforesaid mechanism at the selected destination.

A convenient known means for this purpose is illustrated in FIG. 1. The tray 2 is normally locked to the tray-supporting frame 7 by a latch 7' pivotally mounted on the said frame and engaged with a pin 2' projecting from an upward extension 5' of one of the side plates 5 of the tray. Except at a selected destination, the latch 7' will remain engaged with the pin 2' and the tray will pass delivery points without discharge of the container 1 being initiated. When the tray 2 approaches the delivery point which is the destination means having a location corresponding to that of the projection 3 or 4, as the case may be, will cause release of the latch 7' from the pin 2' so that the tray 2 will tilt forwardly under gravity to the position shown in chain lines and cause the container 1 to be discharged. For example, the projection 4, rising with the tray 2, may engage a switch controlling the energization of an electromagnet which is fixed beside the conveyor path and is adapted for moving a stop 7" from an inoperative position shown in chain lines, in which it is clear of the rising latch 7', to an operative position shown in full lines, in which it will obstruct the rising latch 7', and disengage it from the pin 2'. The tilting of the tray 2, when released, may be controlled in a well-known manner.

Locking means for latching the container 1 to the tray 2 may be duplicated at the two sides of the tray. For the sake of simplicity, however, locking means at one side only will be assumed in describing the locking means illustrated.

With the arrangement of FIG. 1, in the normal condition of the tray 2 when conveying a container 1 (as shown in full lines), forward withdrawal of the slightly rearwardly tilted container from the tray is obstructed by the engagement, in a loop 8 fixed to the end of the container, of a latch 9' pivotally mounted on the upper end of a bar 9 and spring-loaded in the anti-clockwise direction against a stop 9" on the said bar. A loop 8 is provided at each end of the container 1, so that the latter can be locked in either the normal or the reversed position on the tray 2. The bar 9 is guided in a slotted bracket 10 fixed to the underside of the tray 2 and engages by laterally disposed rollers 11 with a forwardly and downwardly inclined rail 12 fixed to the frame 7. The bar 9 is coupled to the front end of the tray 2 by a link 13 pivotally connected to the bar at 14 and to the tray at 15. The link 13 is guided in a slotted downward extension 10' of the bracket 10. The loop 8 which is engaged by the latch 9' projects through a hole 16 in a flange 17 at the rear of the tray 2. A rearward extension 18 of the flange 17 covers the top of the loop 8.

The geometry of the arrangement is such that in the normal condition of the tray, shown in full lines, the latch 9' at the upper end of the bar 9 is held in the loop 8, thus preventing the container 1 from being drawn forwardly from the tray 2. The container cannot be lifted upwardly from the tray because of the engagement of the loop 8 in the hole 16 in the tray flange 17. Easy interference with the latch 9' is prevented by the flange extension 18. When, however, the tray is caused or permitted to tilt forwardly under the control of the mechanism at the preset destination, the bar 9 is drawn downwardly by the rail 12 and under the control of the link 13, so that it assumes the position 9a shown in chain lines, in which the latch 9' no longer engages the loop 8. The container 1 can therefore slide off the tray 2 or can be otherwise removed. On loading of the tray 2 with a container 1, it is only necessary to slide the container into position, whereupon the latch 9' on the bar 9 engages automatically in the loop 8.

In the arrangement illustrated in FIGS. 2 and 3, locking of the container 1 to the tray 2 is effected by the engagement of the rear part of a segmental body 19 over the lower flange 20 (FIG. 3) of a channel-shaped member 21 fixed under the container. Such a member 21 is provided at each end of the container. The body 19 is mounted at its geometric axis by a pivot 22 on the upper end of one arm of a bellcrank lever 23. The other arm of this lever, which is pivotally supported at 24 in a bracket 25 fixed under the tray 2, is connected by a pivot 26 to a link 27 which is itself pivotally connected at 28 to a forward extension 29 from the frame 7. The body 19 is weighted or sprung anti-clockwise and has a laterally projecting stop 30 which is engageable with the lever 23 to prevent anti-clockwise turning of the said body from the locking position shown in FIG. 3, but which does not obstruct clockwise turning thereof.

The geometry of the above-described arrangement is such that in the normal conveying position of the tray 2 (shown in full lines in FIG. 2), the body 19 prevents the container 1 from being either drawn forward or lifted, at the rear, from the said tray. However, when the tray 2 is tilted forwardly (as shown in chain lines in FIG. 2), the linkage 23, 27 causes the body 19 to be swung forwardly and downwardly to an extent sufficient to release the container 1 from the tray. When a container 1 is placed on the tray 2, the body 19 will be rocked forwardly (clockwise) to allow the flange 20 to pass and will then return to engage over the said flange.

In the arrangement shown in FIGS. 4 and 5, the container 1 is locked to the tray 2 at the front as well as the rear by segmental bodies 19', 19" similar to the body 19. The lower arm of the bellcrank lever 23', however, is merely biased towards a stop 31 on the frame 7 by a spring 32 anchored at 33 on one of the side plates 5 of the tray. The lever 23 is coupled by a link 34 to a bellcrank lever 23" similarly supporting the segmental body 19" at the front. In the conveying position of the tray 2, removal of the container either upwardly or forwardly is obstructed by both of the bodies 19', 19". When the tray 2 tilts forwardly (as shown in chain lines in FIG. 4), however, the lever 23 loses contact with the stop 31 and is turned in an anticlockwise direction by the spring 32. The body 19' releases the container 1, as does the body 19", which is moved simultaneously through the link 34. When a container 1 is placed on the tray 2, the bodies 19', 19" will rock towards each other momentarily to allow the flanges 20 to pass.

The above-described locking means have the advantages of simplicity and reliability. If necessary, however, more complicated forms of locking mechanism may be employed. For example, such mechanism may include means by which the container is momentarily arrested as it commences to slide forward on the tilted tray, whereupon the mechanism operates not only to initiate release of means locking the container to the tray bmut also to remove the aforesaid arresting means to permit continued sliding movement of the said container to complete its delivery.

With any of the above described arrangements, the locking means or mechanism may be enclosed so that it is not readily accessible for interference. Provision may be made for preventing access to the conveyor at the delivery points, including power-operated doors and/or power-operated delivery means, each of which is opened or operated automatically upon the approach to the respective point of the loaded container only if the selection means has been set for that point.

At loading points, provision may also be made for a loading door to be automatically opened, or released, upon the approach to it of an empty carrier of the conveyor. It may then be arranged to open only if the loading of a container on to the conveyor at that point has been prepared for, e.g. a container is in position ready to be loaded.

Delivery may take place into a locked room, locked chute or the like, so that unauthorized access is completely precluded.

If it is desired to use a selection system employing selectively operable destrination setting devices, for example push buttons, means may be provided for locking th set device until the destination has been reached. Means for this purpose are described and claimed in the specification of our British Patent No. 1,021,746.

I claim:

1. A selective-delivery conveyor of the kind in which the material to be conveyed is loaded on to and removed from carriers, forming part of the conveyor, in containers, comprising, in addition to means operative automatically for preventing delivery except at a selected destination, locking means provided on each carrier and engageable with a container on dispatch for latching the said container to the said carrier so that it cannot be removed therefrom and means for automatically releasing the said locking means only when the selected destination is reached.

2. A selective-delivery conveyor of the kind in which the material to be conveyed is loaded on to carriers, forming part of and moving with the conveyor, in containers and parts of the said carriers are tilted automatically at the respective selected destinations for the delivery of the containers, comprising locking means provided on each carrier for latching a container to the said carrier on dispatch and releasable automatically upon tilting of the said tiltable carrier part at the selected destination.

3. A conveyor as claimed in claim 1, wherein said locking means is arranged to be held engaged and to secure the container not only against being drawn off from the carrier but also against being lifted off the latter, at least at one end.

4. A conveyor as claimed in claim 2, wherein the said locking means comprises a latch on a bar which is guided on the said tiltable carrier part and is actuated, for disengaging the latch from the container on tilting of the said part, by a member which is inclined in relation to the normal, conveying, position of the said part and is mounted upon a nontiltable part of the carrier.

5. A conveyor as claimed in claim 2, wherein the said locking means comprises a latch on a bar which is guided on the said tiltable carrier part and is actuated, for disengaging the latch from the container on tilting of the said part, by a member which is inclined in relation to the normal, conveying, position of the said part and is mounted upon a nontiltable part of the carrier, movement of the said bar being controlled by a link, connecting it to the said tiltable part.

6. A conveyor as claimed in claim 2, wherein the said locking means comprises at least one segmental latch member which is pivotally mounted on a lever pivoted upon the said tiltable carrier part and is engageable with a part of the container for locking the latter to the carrier, the said lever being operatively engaged with a nontiltable part of the carrier in such a manner that the segmental member is caused to be released from the container upon tilting of the said tiltable carrier part.

7. A conveyor as claimed in claim 2, wherein the said locking means comprises at least one segmental latch member which is pivotally mounted on a lever pivoted upon the said tiltable carrier part and is engageable with a part of the container for locking the latter to the carrier, the said lever being operatively engaged with a nontiltable part of the carrier in such a manner that the segmental member is caused to be released from the container upon tilting of the said tiltable carrier part, latch members at the forward and rear ends of the carrier being coupled so as to be released together upon tilting of the said tiltable carrier part.

8. A conveyor as claimed in claim 1, wherein the containers are provided with fixed selection means at two different sides thereof, for example at opposite ends, containers destined for different delivery points having differently located fixed selection means at one of the said sides, whereas the fixed selection means at the other of the said sides is located in the same position on all containers.

References Cited

UNITED STATES PATENTS

| 2,919,790 | 1/1960 | Winz et al. | 198—38 |
| 3,014,573 | 12/1961 | Baumann et al. | 198—38 |
| 3,082,855 | 3/1963 | Habight et al. | 198—38 X |

FOREIGN PATENTS 1,350,497  12/1963  France.

ANDRES H. NIELSEN, *Primary Examiner.*